United States Patent
Yoshida

(10) Patent No.: US 7,773,872 B2
(45) Date of Patent: Aug. 10, 2010

(54) CAMERA HAVING A FUNCTION OF PREDICTING A FUTURE IMAGE PLANE POSITION FROM A CHANGE IN A PLURALITY OF PAST IMAGE PLANE POSITIONS AND OF TIME DETECTION, A PHOTOGRAPHIC LENS TO BE MOUNTED ON THE SAME, AND A CAMERA SYSTEM

(75) Inventor: Tomokazu Yoshida, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 12/028,179

(22) Filed: Feb. 8, 2008

(65) Prior Publication Data
US 2008/0199169 A1    Aug. 21, 2008

(30) Foreign Application Priority Data
Feb. 19, 2007   (JP) .............................. 2007-038488

(51) Int. Cl.
*G03B 15/16* (2006.01)

(52) U.S. Cl. ...................... 396/95; 396/153; 348/208.14

(58) Field of Classification Search .................... 396/95
See application file for complete search history.

(56) References Cited

U.S. PATENT DOCUMENTS

| | | | |
|---|---|---|---|
| 4,963,910 A * | 10/1990 | Ishimura | 396/71 |
| 4,969,003 A * | 11/1990 | Ohnuki et al. | 396/95 |
| 5,060,002 A * | 10/1991 | Ohnuki et al. | 396/95 |
| 5,079,581 A * | 1/1992 | Kadohara et al. | 396/95 |
| 5,113,210 A * | 5/1992 | Kashiyama et al. | 396/86 |
| 5,144,355 A * | 9/1992 | Hamada et al. | 396/95 |
| 5,625,434 A * | 4/1997 | Iwane | 396/95 |
| RE36,546 E * | 2/2000 | Uenaka | 396/95 |
| 2005/0104993 A1* | 5/2005 | Matsumoto | 348/345 |

FOREIGN PATENT DOCUMENTS

JP   2001-021794 A   1/2001

* cited by examiner

*Primary Examiner*—W. B. Perkey
*Assistant Examiner*—Bret Adams
(74) *Attorney, Agent, or Firm*—Canon U.S.A., Inc. I.P. Division

(57) ABSTRACT

A camera is provided which is configured to receive a photographic lens having a diaphragm. The camera includes a defocus amount detection unit configured to detect first information corresponding to a defocus amount, from light passing through the photographic lens mounted on the camera; an acquisition unit configured to acquire second information corresponding to an image-forming position from a lens position output unit provided on the photographic lens; and an image-forming position prediction unit configured to predict a change in image-forming position based on a change in the second information and a plurality of the past first information stored in a memory, wherein the image-forming position prediction unit predicts the image forming position in consideration of third information corresponding to time required for diaphragm driving that is acquired from a diaphragm driving time prediction unit provided on the photographic lens.

3 Claims, 3 Drawing Sheets

CAMERA HAVING A FUNCTION OF PREDICTING A FUTURE IMAGE PLANE POSITION FROM A CHANGE IN A PLURALITY OF PAST IMAGE PLANE POSITIONS AND OF TIME DETECTION, A PHOTOGRAPHIC LENS TO BE MOUNTED ON THE SAME, AND A CAMERA SYSTEM

BACKGROUND OF THE INVENTION

1. Field of the Invention

The present invention relates to a camera having a function of predicting a future image plane position from a change in a plurality of past image plane positions and time of detection, a photographic lens to be mounted on this type of camera, and a camera system.

2. Description of the Related Art

Conventionally, in a camera system such as an interchangeable lens type single-lens reflex camera, a technique has been known, which combines a light flux from an object passing through different exit pupil areas of a photographic lens on a pair of line sensors. Consequently, an amount of image displacement can be determined which is a relative position displacement amount of a pair of image signals obtained by photo-electrically converting of an object image. As a result, a defocus amount of the object is detected from the amount of image displacement and based on the detected amount, the photographic lens is driven.

Further, many of these camera systems include a servo mode in which lens drive tracks not only a still object but also a moving object.

In a specific tracking method, an image plane position of an object (predictive position which may be focused on the object) is acquired from previously obtained two defocus amounts. In the tracking method, a difference between the image plane position of the object and a time of detection is obtained to determine an amount of displacement of the image plane position, that is, an image plane speed is calculated. Thus, the tracking method predicts the image plane position from a detection point after a predetermined time passes, to drive a photographic lens to the position.

Further, there is another tracking method. According to the tracking method, an image plane speed and an image plane acceleration, which is a change amount of the image plane speed, are calculated as a second order curve from previously obtained three image plane positions of an object and detection times. By the above-described calculation, an image plane position from a detection point after a predetermined time passes can be predicted.

Furthermore, a technique is described in Japanese Patent Application Laid-Open No. 2001-021794 in which the most suitable predictive function is selected by statistical processing.

These methods determine a predictive function based on a previously obtained temporal change of an image plane position of an object. The predictive function is extended over future time to predict an image plane position after a predetermined time passes, based on a detection point. Accordingly, the larger the difference between a predetermined time estimated when prediction is made, and the time when a release button is actually pressed and exposure is made, the lower the accuracy of the prediction. That is, it is important to accurately predict the time (also referred to as release time lag) between when the release button is actually pressed and when the exposure is started.

In an interchangeable lens type single-lens reflex camera, a factor that determines the release time lag exists on both of the camera (main body) side and the interchangeable lens side. On the camera side, the factor is the time (also referred to as mirror move up time) required after the release button is pressed until a mirror is retracted or a shutter is driven. On the interchangeable lens side, the factor is the time required to stop down an aperture of a diaphragm to a predetermined exposure (hereinafter, referred to as diaphragm driving time).

SUMMARY OF THE INVENTION

The present invention is directed to a camera, a photographic lens, and a camera system capable of predicting an accurate image plane position during exposure and shooting of a moving object with higher accuracy.

According to an aspect of the present invention, a camera is provided which is adapted to receive a photographic lens having a diaphragm. The camera includes a defocus amount detection unit configured to detect first information corresponding to a defocus amount, from light passing through the photographic lens mounted on the camera; an acquisition unit configured to acquire second information corresponding to an image-forming position from a lens position output unit provided on the photographic lens; and an image-forming position prediction unit configured to predict a change in the image-forming position based on a change in the second information and a plurality of the past first information stored in a memory, wherein the image-forming position prediction unit predicts the image forming position in consideration of third information corresponding to time required for diaphragm driving that is acquired from a diaphragm driving time prediction unit provided on the photographic lens.

According to another aspect of the present invention, a photographic lens is provided which is mountable on a camera having a defocus amount detection unit configured to detect first information corresponding to a defocus amount, from light passing through the photographic lens mounted on the camera. The lens includes an image-forming position detection unit configured to detect second information corresponding to an image-forming position and output the second information to the mounted camera, a diaphragm driving time prediction unit configured to output third information corresponding to the time required for diaphragm driving, to the mounted camera, and a lens driving unit configured to move the image-forming position based on the defocus amount calculated by the defocus amount detection unit provided on the camera.

According to an exemplary embodiment of the present invention, a camera, a photographic lens, and a camera system are provided which are capable of predicting an accurate image plane position at the time of exposure and shooting of a moving object with higher accuracy.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
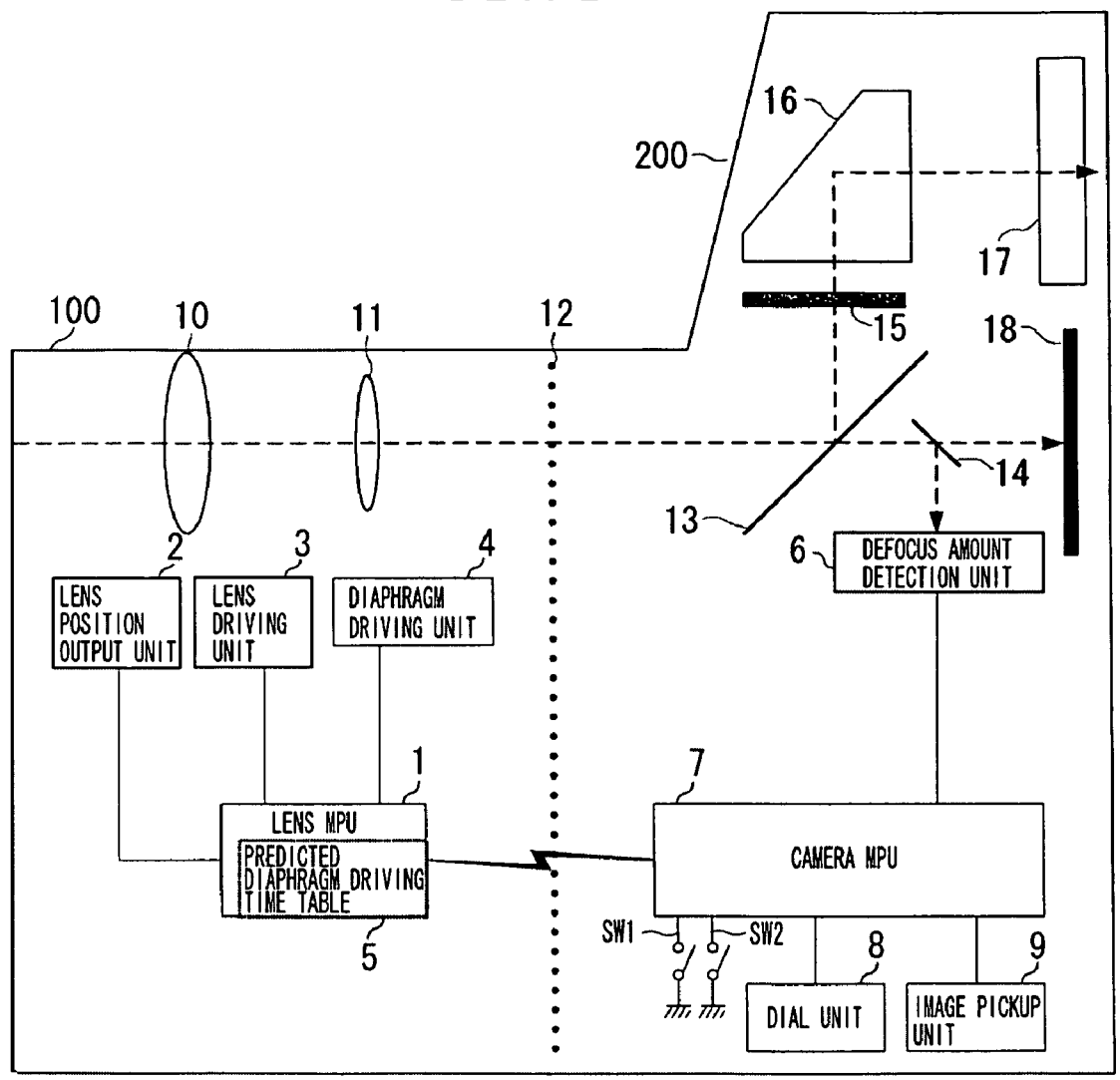
FIG. 1 is a diagram illustrating an example part of a single-lens reflex camera according to an exemplary embodiment of the present invention.

FIG. 1 is a diagram illustrating an example part of a photographic lens 100 and a camera 200 according to an exemplary embodiment of the present invention. This particular example camera corresponds to an interchangeable lens type single-lens reflex camera. In FIG. 1, the photographic lens 100 includes a lens micro processing unit (MPU) 1 and a lens position output unit 2 (image-forming position output unit). The lens position output unit 2 outputs a relative position of a lens 10 to the camera 200 as a pulse signal of a lens driving unit 3. The lens 10 includes an image-forming function. Thus, the lens position output unit 2 has a function of detecting information corresponding to an image-forming position of the photographic lens 100 and outputting the detected information to the camera 200. The photographic lens 100 includes the lens driving unit 3 such as a motor configured to drive the lens 10. The photographic lens 100 includes a diaphragm driving unit 4 configured to drive a diaphragm 11.

The lens position output unit 2 can measure a relative delivery amount at the present position of the lens 10 (image-forming position). More specifically, an encoder of the lens position output unit 2 outputs an optical change in a lens moving unit as a change in electric potential, to the lens MPU 1 which count the potential change. Thus, the lens position output unit 2 can measure the relative delivery amount at the present position of the lens 10.

The lens MPU 1 includes a predicted diaphragm driving time table 5 (hereinafter simply referred to as a table 5). The lens MPU 1 stores predicted driving time of a diaphragm 11 when the lens MPU 1 executes diaphragm driving of a set aperture value, in the table 5. The lens MPU 1 searches the predicted driving time of the diaphragm 11 from the table 5. Then, the lens MPU 1 communicates the predicted diaphragm driving time that has been retrieved, to a camera MPU 7 via a mount 12. This allows the camera MPU 7 to acquire the predicted diaphragm driving time when the lens MPU 1 executes the diaphragm driving in order to obtain the set aperture value (target aperture value).

Here, mirror move up time of a mirror 13 which will be described later, can be measured beforehand and stored on the camera side. On the other hand, since time required for diaphragm driving is different for each interchangeable lens serving as the photographic lens 100, it is not easy to acquire the time required for diaphragm driving on the camera side. In one method, the time previously required for diaphragm driving when an aperture of the diaphragm was actually stopped down in the interchangeable lens is stored on the camera side. However, when the interchangeable lens is attached to the camera for the first time, the diaphragm driving time cannot be determined. Further, since a storage capacity on the camera side is limited, it is also not easy to store the time required for the diaphragm that corresponds to each aperture value (diaphragm driving time) of all the interchangeable lenses. Accordingly, as described above, predicted driving time of the diaphragm is stored in the table 5 which is transmitted to the camera MPU 7.

The interchangeable photographic lens 100 includes the lens MPU 1, the lens position output unit 2, the lens driving unit 3, the diaphragm driving unit 4, the table 5, the lens 10, and the diaphragm 11. Then, the interchangeable photographic lens 100 is connected to the camera (main body) 200 via the mount 12 as shown by broken lines in FIG. 1. The interchangeable photographic lens 100 is detachably attached to the camera (main body) 200.

Next, the camera side will be described. The camera 200 includes a defocus amount detection unit 6 and the camera MPU 7. The defocus amount detection unit 6 is configured to detect information corresponding to a defocus amount, from light passing through the photographic lens 100 mounted on the camera 200 as described later. The camera MPU 7 and the lens MPU 1 can mutually communicate via a signal line of the mount 12. Further, the camera MPU 7 includes an analog-to-digital (A/D) conversion unit which will be described later. Furthermore, the camera 200 includes a timer which can measure the time of day and a time.

The camera 200 includes a dial unit 8 for various settings (e.g., shutter speed, aperture value, and photographic mode) of the camera 200 and an image pickup unit 9. A switch SW1 is turned on by a first stroke operation (i.e., half press) of a release button. A switch SW2 is turned on by a second stroke operation (i.e., full press) of the release button.

The defocus amount shows how a focus required for automatic focus adjustment is displaced from an object. The camera MPU 7 calculates the defocus amount using an output from the defocus amount detection unit 6. Specifically, the camera MPU 7 calculates the defocus amount from an image displacement amount of two images that are formed from a light flux of an object passing through two different areas sandwiching an optical axis of the photographic lens 100. The light flux of these two images passes through a main mirror 13 provided as a half mirror. The light flux is reflected off a sub mirror 14 located behind the main mirror 13. The light flux is led to the defocus amount detection unit 6 by a secondary image-forming optical system (not shown). The defocus amount detection unit 6 includes a line-shaped photoelectric conversion element. The defocus amount detection unit 6 outputs an object image formed on the photoelectric conversion element as a change in electric potential. The camera MPU 7 reads a signal of these two images as a change in numerical value with the built-in A/D conversion unit and calculates an image displacement amount to determine the defocus amount by applying a correlation operation to the signal.

In addition, on the camera side, a focusing screen 15, a pentagonal mirror 16, a finder 17, and a photographic element 18 are provided.

Next, an operation of the single-lens reflex camera 200 according to one exemplary embodiment of the present invention will be described using a flowchart in FIG. 2.

In step S101, when a switch SW1 is turned on, an automatic focus adjustment operation is started. First, in step S102, the camera MPU 7 executes a routine to detect a defocus amount. After the detection of the defocus amount is completed, in next step S103, the camera MPU 7 determines whether a switch SW2 is turned on. If the switch SW2 is turned on (YES in step S103), the processing proceeds to step S104. The camera MPU 7 executes a series of operations for shooting.

First, in step S104, the camera MPU 7 moves up the main mirror 13 (retracts the mirror outside a photographic light path). Then, in next step S105, the camera MPU 7 communicates an aperture value which is already set by the dial unit 9 to the lens MPU 1. Thus, the camera MPU 7 acquires the predicted driving time of the diaphragm 11 which corresponds to a set aperture value. In subsequent step S106, the camera MPU 7 stops down an aperture of the diaphragm 11.

If the camera MPU 7 determines that diaphragm driving is started in step S106 or the switch SW2 is not turned on in step S103 (NO in step S103) as described above, the processing proceeds to step S107. Then, in step S107, the camera MPU 7 executes a routine of predictive control. The detail of the routine will be described later using a flowchart in FIG. 3. After the camera MPU 7 completes the routine of the predictive control, the processing proceeds to step S108 and the camera MPU 7 starts driving for focus adjustment of the lens 10.

In next step S109, the camera MPU 7 determines whether the switch SW1 is turned on. If the switch SW1 is turned on (YES in step S109), the processing returns to the defocus amount detection routine in step S102. Hereafter, the processing repeats the flow of automatic focus adjustment until the switch SW1 is turned off. Further, if the camera MPU 7 determines that the switch SW1 is not turned on (NO in step S109), in step S110, the camera MPU 7 ends the automatic focus adjustment.

Next, the routine of predictive control to be executed in step S107 in FIG. 2 will be described in detail using the flowchart in FIG. 3.

In step S201, the camera MPU 7 starts predictive control. First, in step S202, the camera MPU 7 calculates an image plane position and the time to detect the image plane position from a defocus amount. A photoelectric conversion element included in the defocus amount detection unit 6 requires a certain storage time of an electric charge until an image signal is obtained. Accordingly, the camera MPU 7 regards a middle point between the time of the start of electric charge storage and the time of the end of electric charge storage as the time of detection of the defocus amount. The camera MPU 7 adds the defocus amount to a relative position of the lens 10 obtained by communicating with the lens MPU 1. Thus, the camera MPU 7 calculates a predictive value of the image plane position of an object.

Since the time of detection of the defocus amount is the time of detection of the image plane position as it is, the camera MPU 7 stores a set of the image plane position and the time of detection of the image plane position in a memory of the camera MPU 7 in next step S203. A data structure to be stored in the memory is provided by a queue. Thus, the memory stores data in order until the predetermined number of data. However, with respect to data thereafter, the memory writes newest data over the oldest data. In the present exemplary embodiment, the memory can store data up to maximum of three sets.

Thereafter, in step S204, the camera MPU 7 determines whether the camera MPU 7 can predict a future image plane position based on the number of data stored in the memory of the camera MPU 7. In the present exemplary embodiment, a function of predicting the future image plane position is given by formula "$y(t)=\alpha+\beta t+\gamma t^2$" which is a second-order function of a release time lag (t) serving as a variable t of the release time lag. Since three unknown coefficients $\alpha$, $\beta$, and $\gamma$ need to be determined, minimum of three sets of data is sufficient to determine the coefficients.

As a result of the above-described determination, if the number of data is sufficiently present (YES in step S204), the processing proceeds to step S205. The camera MPU 7 executes a series of operations for prediction. First, in step S205, the camera MPU 7 determines whether the switch SW2 is turned on. If the camera MPU 7 determines that the switch SW2 is turned on (YES in step S205), the processing proceeds to step S206. Then, in step S206, the camera MPU 7 compares a predicted diaphragm driving time obtained in step S105 and a mirror move up time stored in the memory of the camera MPU 7. If the predicted diaphragm driving time is longer than the mirror move up time (YES in step S206), the processing proceeds to step S207. The camera MPU 7 uses the predicted diaphragm driving time as a release time lag. The camera MPU 7 predicts an image plane position according to the above-described function y(t) and calculates a lens driving amount based on the predicted image plane position. That is, the camera MPU 7 predicts an image plane position at the time of exposure. On the other hand, if the mirror move up time is longer than or equal to the predicted diaphragm driving time (NO in step S206), the processing proceeds to step S208. The camera MPU 7 uses the mirror move up time as a release time lag. The camera MPU 7 predicts an image plane position according to the above-described function y(t) and calculates the lens driving amount.

Further, in step S205, if the camera MPU 7 determines that the switch SW2 is not turned on, the processing proceeds to step S209. The camera MPU 7 regards a detection cycle of an image plane position as a release time lag to calculate a lens driving amount. The camera MPU 7 determines the detection cycle of the image plane position from a difference between the time of newest detection and the time of the last detection among sets of the image plane position and the time of detection stored in the memory of the camera MPU 7. Thus, the lens 10 tracks an object which moves while the switch SW2 is not turned on (that is, a state where the switch SW1 is turned on). In this case, if the time of detection of the next image plane position is equal to the detection cycle of the image plane position and also the accuracy of the function that predicts the image plane position is high, a defocus amount to be detected next can be expected to be substantially zero. That is, the lens 10 will track the moving object.

Furthermore, in step S204, if the camera MPU 7 determines that the number of data is not sufficient as a predictable number of the image plane position, the processing proceeds to step S210. The camera MPU 7 calculates the lens driving amount from the defocus amount as it is.

Figure 2:
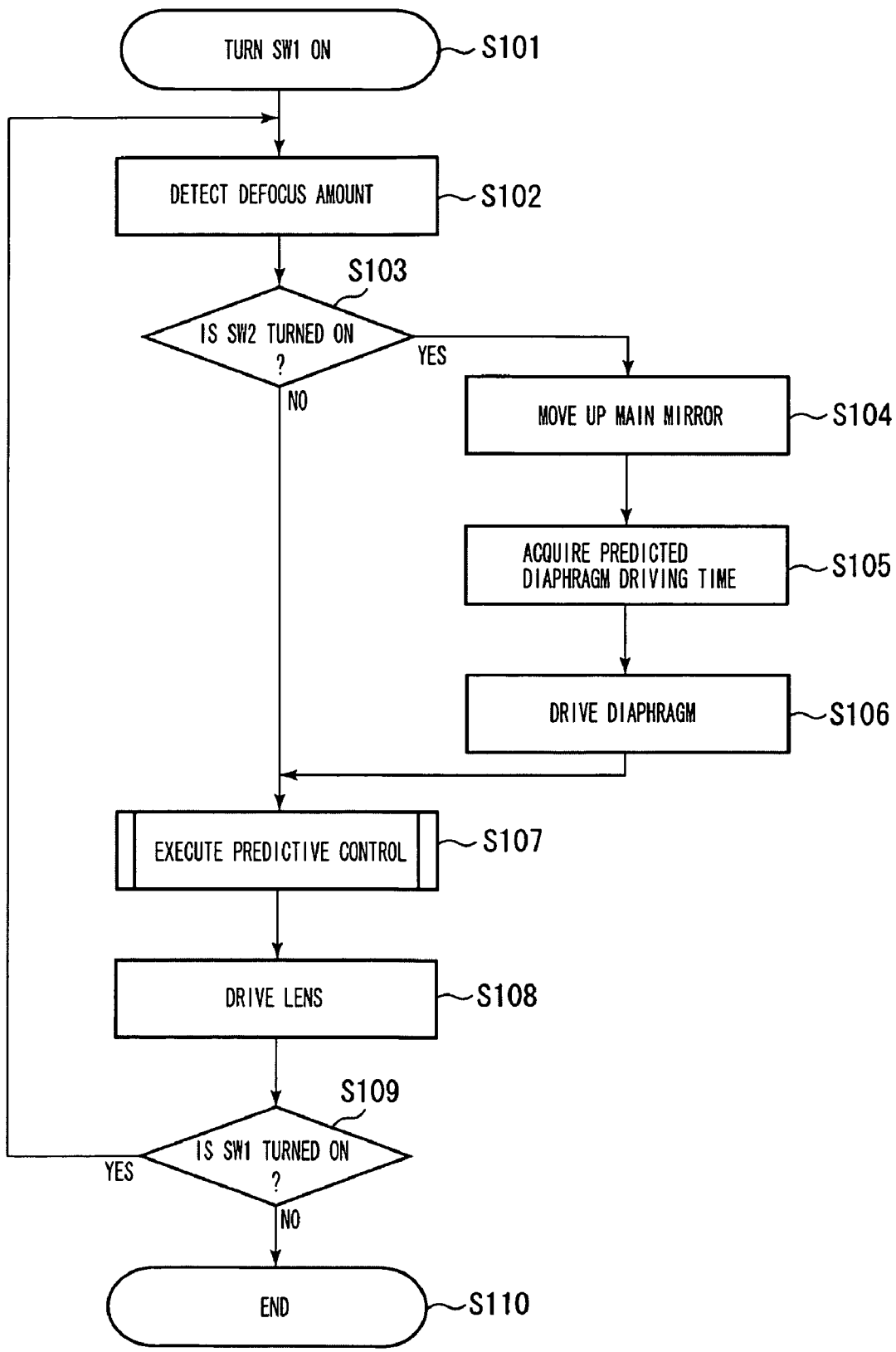
FIG. 2 is a flowchart illustrating an example operation of a single-lens reflex camera according to an exemplary embodiment of the present invention.
Figure 3:
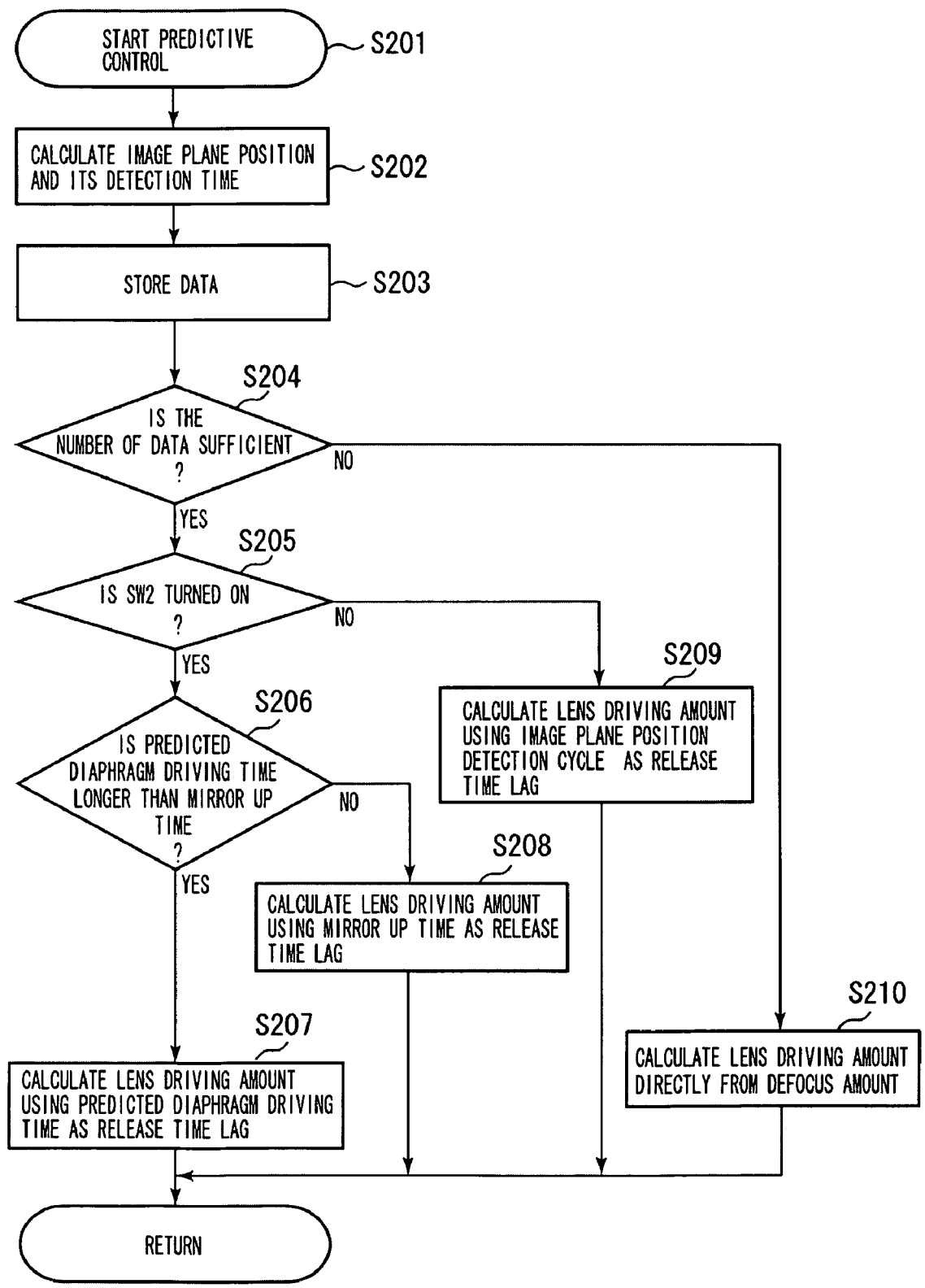
FIG. 3 is a flowchart illustrating an example operation of predictive control to be executed in step S107 in FIG. 2.

If the camera MPU 7 calculates the lens driving amount in any of steps S207 to step S210, the processing proceeds to step S211 and the processing returns to step S107 in FIG. 2.

In the above-described configuration, the camera side acquires the predicted diaphragm driving time from the interchangeable photographic lens 100 mounted on the camera 200. Then, an accurate release time lag is determined based on this predicted diaphragm driving time. Then, based on the acquired time, an accurate image plane position of a moving object at the time of exposure is predicted. Based on the predicted result, the lens 10 is driven. This enables more accurate shooting of a moving object.

In the present exemplary embodiment, a predicted diaphragm driving time in the predicted diaphragm driving time table 5 is a premeasured fixed value. However, in the case of a camera system where a predicted diaphragm driving time is changed by temperature, aging or the like, the lens MPU 1 may observe the change to correct the predicted diaphragm driving time. Specifically, in a case where the lens MPU 1 observes temperature to correct the predicted diaphragm driving time, calculates a difference between the predicted diaphragm driving time table 5 and an actual diaphragm driving time, stores the difference, and corrects the predicted diaphragm driving time, the present invention can similarly be applied. Also, in a case where the camera MPU 7 observes temperature to transmit it to the lens MPU 1, and the lens MPU 1 corrects the predicted diaphragm driving time table 5 based on the observed temperature, the present invention can similarly be applied.

A mirror move up time is a premeasured fixed value. However, in the case of a camera system where the mirror move up time is changed depending on temperature, aging, further a battery condition or the like, when the lens MPU 1 observes the change to correct the moved up time, the present invention can similarly be applied.

Furthermore, in the present exemplary embodiment, a motor serving as a driving source of the lens driving unit 3 and the diaphragm driving unit 4 is provided on the interchangeable photographic lens 100 side. However, in a case where the motor is provided on the single-lens reflex camera 200 side and the motor drives a driving combination body from the single-lens reflex camera 200 side via the mount 12, the present invention can similarly be applied.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-038488 filed Feb. 19, 2007, which is hereby incorporated by reference herein in its entirety.

What is claimed is:

1. A camera capable of mounting a photographic lens having a diaphragm, the camera comprising:
   a mirror capable of a mirror move up;
   a defocus amount detection unit configured to detect first information corresponding to a defocus amount, from light passing through the photographic lens mounted on the camera;
   an acquisition unit configured to acquire second information corresponding to an image-forming position from a lens position output unit provided on the photographic lens; and
   an image-forming position prediction unit configured to predict a change in the image-forming position based on a change in the second information and a plurality of the past first information stored in a memory, wherein the image-forming position prediction unit predicts the image forming position in consideration of third information corresponding to time required for diaphragm driving that is acquired from a diaphragm driving time prediction unit provided on the photographic lens, in case where the time required for the diaphragm driving is longer than the time for the mirror to complete the mirror move up.

2. A camera adapted to receive a photographic lens having a diaphragm, the camera comprising:
   a defocus amount detection unit configured to detect first information corresponding to a defocus amount, from light passing through the photographic lens mounted on the camera;
   an acquisition unit configured to acquire second information corresponding to an image-forming position from a lens position output unit provided on the photographic lens; and
   an image-forming position prediction unit configured to predict a change in the image-forming position based on a change in the second information and a plurality of the past first information stored in a memory, wherein the image-forming position prediction unit predicts the image forming position in consideration of third information corresponding to time required for diaphragm driving that is acquired from a diaphragm driving time prediction unit provided on the photographic lens,
   wherein the image-forming position prediction unit predicts the image-forming position by using mirror move up time as a release time lag when the minor move up time is longer than or equal to time required for diaphragm driving which corresponds to the acquired third information.

3. A camera system comprising:
   a camera; and
   a photographic lens having a diaphragm, the lens adapted to be mounted on the camera;
   wherein the camera includes,
   a defocus amount detection unit configured to detect first information corresponding to a defocus amount, from light passing through the photographic lens mounted on the camera;
   an acquisition unit configured to acquire second information corresponding to an image-forming position from a lens position output unit provided on the photographic lens; and
   an image-forming position prediction unit configured to predict a change in the image-forming position based on a change in the second information and a plurality of the past first information stored in a memory, wherein the image-forming position prediction unit predicts the image forming position in consideration of third information corresponding to time required for diaphragm driving that is acquired from a diaphragm driving time prediction unit provided on the photographic lens,
   wherein the image-forming position prediction unit predicts the image-forming position by using mirror move up time as a release time lag when the mirror move up time is longer than or equal to time required for diaphragm driving which corresponds to the acquired third information; and
   wherein the photographic lens includes,
   an image-forming position detection unit configured to detect second information corresponding to an image-forming position and output the second information to the mounted camera;
   a diaphragm driving time prediction unit configured to output third information corresponding to time required for diaphragm driving, to the mounted camera; and
   a lens driving unit configured to move the image-forming position based on the defocus amount calculated by the defocus amount detection unit provided on the camera.

* * * * *